United States Patent Office 2,898,707
Patented Aug. 11, 1959

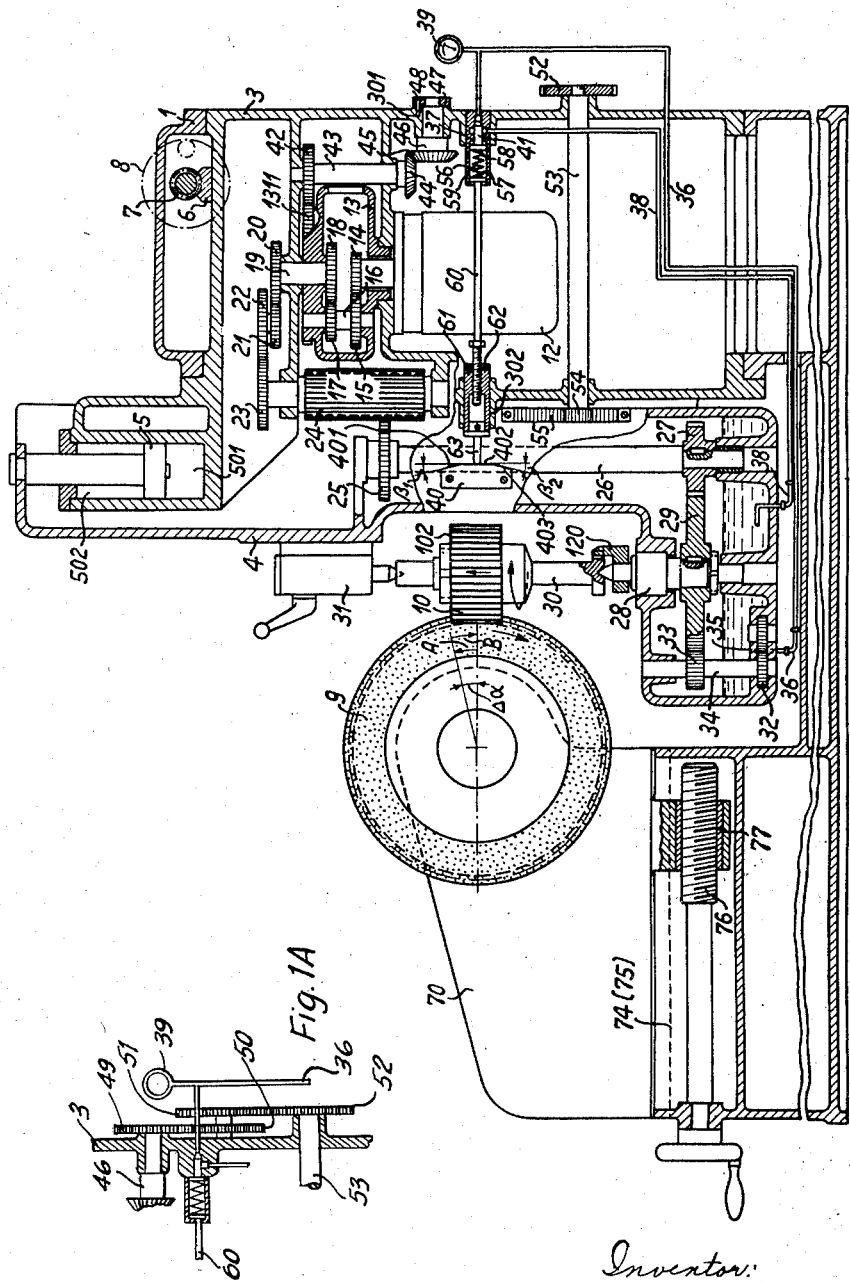

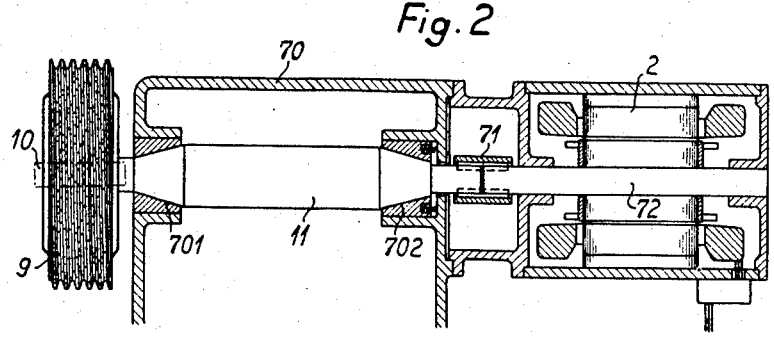
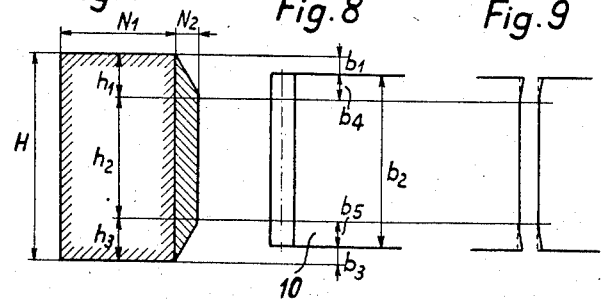
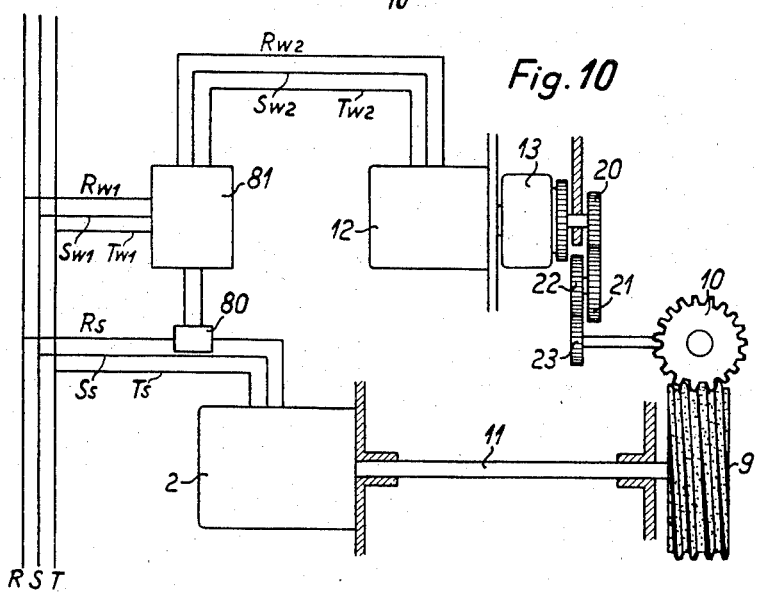

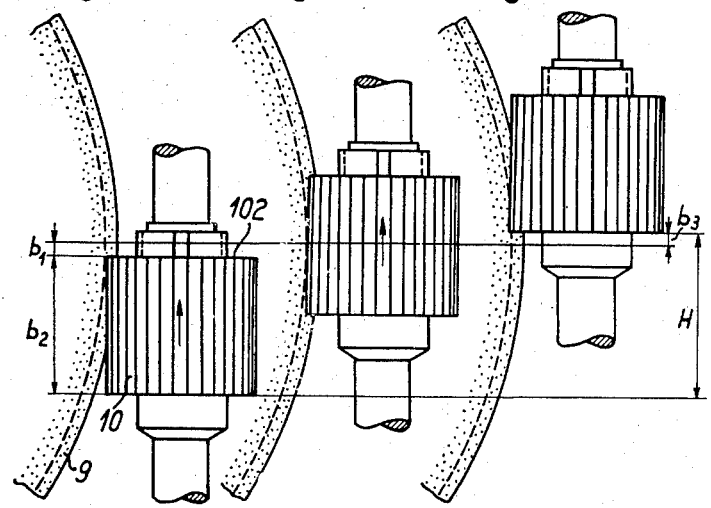
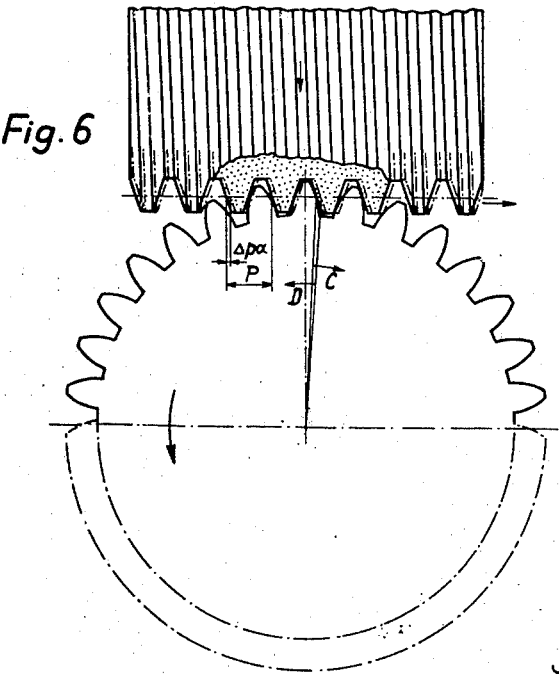

2,898,707

MACHINE FOR THE GRINDING OF SPUR GEARS AND HELICAL GEARS BY THE GENERATING PRINCIPLE

Alfred Rickenmann, Kusnacht, near Zurich, Switzerland, assignor to Reishauer-Werkzeuge A.G., Zurich, Switzerland Application September 17, 1956, Serial No. 610,133

Claims priority, application Switzerland May 2, 1956

4 Claims. (Cl. 51—95)

There exist gear grinding machines which operate on the generating principle and are provided with a grinding worm as the grinding tool. In this type two groups can be distinguished as regards the driving mechanism. In one group the grinding worm and the work piece to be machined are driven from a common source of power, i.e. by a single motor. In the second group, which forms the subject of the following considerations, two synchronous motors are provided, one of which is designed for the driving of the grinding worm, the other of the work piece. In the known gear grinding machines working on the generating principle the work piece is guided past the grinding worm along the axis of the work piece during the grinding process. The position of the axis of the work piece is in accurate agreement with the helix angle of the grinding worm.

When grinding, the stroke of the work piece is chosen at least equal to, mostly however somewhat larger than the width of the teeth to be ground. Depending on whether operation is on the one-way or on the two-ways grinding method an infeed movement takes place in one or in both dead centre positions.

With gear grinding machines of known construction a power-consuming element, for example a gear pump, is built into the work piece drive, the delivery pressure of which pump is adapted to the number of teeth of the work piece. The object of this gear pump is to load the work piece drive and the synchronous motor at the beginning of this drive train permanently to such an extent that the fluctuations, occurring during the grinding and deriving from the work done on the work piece, remain ineffective on the working spindle. In these circumstances the assumption can also be made that owing to this, as it were, constant loading of the work piece drive synchronous motor, no or only very small variations in the load angle occur on the rotor thereof during the grinding process, which variations if any can be considered harmless.

However, when the conditions on the side of the grinding worm are considered, in the known machines the grinding worm is directly coupled to the associated synchronous motor or is connected to the motor shaft through a pair of gears. Devices fulfilling the same task as the power-consuming gear pump arranged in the work piece drive are lacking. Accordingly it can be ascertained by measurements for example with the aid of wattmeters that the power consumed by the synchronous motor driving the grinding worm varies in the course of the grinding operation. In respect of the position of the work piece to be ground relative to the grinding worm it has been found that at the beginning of a working stroke i.e. when the grinding worm grinds the work piece for example in the range of an end face, a lower power is required, than when the middle portion is being ground. Owing to these ascertainable load variations, variations in the load angle occur on the rotor of the synchronous motor for the grinding worm, which also lead forcibly to displacements of the latter.

Under the assumption that the work piece, which is in engagement with the grinding worm during the grinding but is positively driven independently, is during the working process not subject to variations in the rotary movement as viewed from the side of the work piece drive, the aforesaid variations in the load angle on the side of the grinding worm results in faults of the teeth to be ground. The same are recognisable in the first place as faults in the direction of the teeth.

The present invention has the object of providing a method and means which allow to overcome to a large extent the aforesaid faults which are of a very low order of magnitude but are yet disturbing. The idea of the method according to the invention consists in that the variations in the load angle occurring on the rotor of the synchronous motor driving the grinding worm owing to load fluctuations during the grinding, are compensated for by co-ordinated variations in the load angle of the rotor of the synchronous motor driving the work piece so that the position of the work piece relative to the grinding worm in mesh therewith remains permanently constant. The load angle of the rotor of the synchronous motor driving the work piece is conveniently controlled by the aid of control members influenced by the variations in the load angle of the rotor of the synchronous motor driving the grinding worm.

The means according to the invention for carrying out the above method consist for example in that a control template shaped in accordance with the variations during the grinding operation in the load angle of the rotor of the synchronous motor driving the grinding worm is made to influence the pressure of the power-consuming gear pump in order to generate variations in the load of the drive train of the work piece and variations in the load angle of the synchronous motor driving the work piece of such an order of magnitude as to compensate the said variations in the load angle of the rotor of the synchronous motor driving the grinding worm, so that the position of the work piece relative to the grinding worm in contact with it is permanently kept constant.

It is known, that with synchronous motors variations in the load angle can be attained by variations in the feed voltage. This possibility is according to the invention exploited in a second solution of the problem set. The idea of the invention lies here therein that variations in the effective power consumption of the synchronous motor driving the grinding worm, occurring during the grinding process analogous to the variations in the load angle, are used with the aid of measuring and regulating means combined with one another for influencing the feed voltage of the synchronous motor driving the work piece and to effect thereby variations in the load angle of the rotor thereof, which compensate the variations in the load angle of the rotor of the synchronous motor driving the grinding worm, so that the position of the work piece relative to the latter is maintained constant also in this way.

The invention will be described hereinafter with reference to an embodiment diagrammatically illustrated by way of example. In the drawings:

Fig. 1 is a diagrammatic illustration of a gear grinding machine, partly in section;

Fig. 1A shows a modified detail of Fig. 1;

Fig. 2 is a sectional illustration of the driving mechanism for the grinding worm;

Figs. 3 to 5 show three different working phases when grinding a gear;

Fig. 6 is an illustration of the conditions of meshing between grinding worm and work piece;

Figure 11:
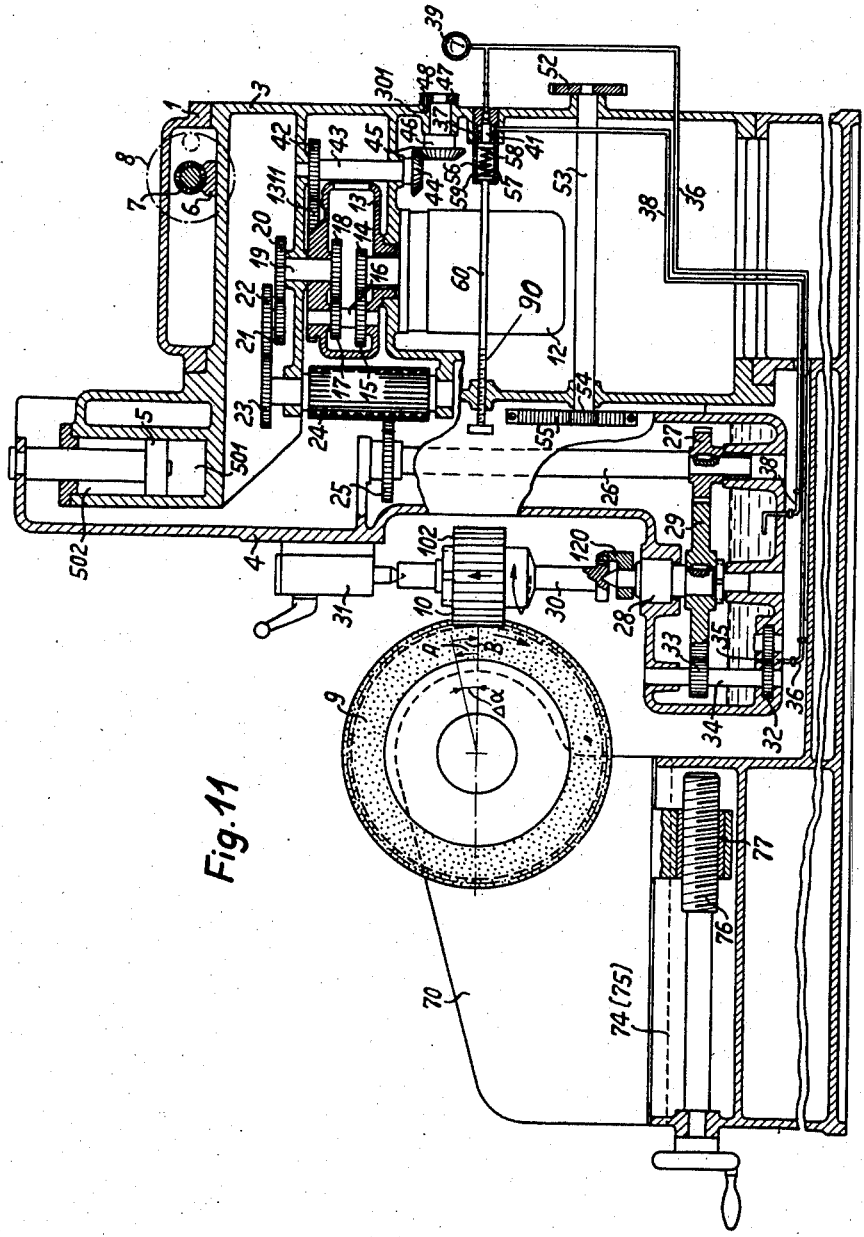

Figs. 7 to 9 give a diagrammatic illustration of the connection between the power required when grinding a gear (Fig. 7) with respect to the face width of the teeth of the work piece (Fig. 8) and to the direction of the teeth to be expected (tooth direction diagram Fig. 9);

Fig. 10 is an electric wiring diagram of the connection of two driving motors;

Fig. 11 is a section similar to Fig. 1 of a modified embodiment.

*General assembly of the machine (Fig. 1)*

On a base 1 a drum 3 is journalled rotatably which carries the slidably mounted work piece carrier slide 4. The latter is shifted up and down during the grinding process, for example by hydraulic means. For the illustration of this possibility a piston 5 may be pointed out which is guided in a bore of the drum 3 and is connected to the work piece carrier slide 4. The two chambers 501, 502 for the piston are set alternately under pressure by the aid of control means (not shown) according to whether the work piece carrier slide is to be moved up or down.

On the drum 3 moreover a worm wheel segment 6 is fixed, which is in mesh with a worm 7. This worm gearing, which can be set in rotation by the aid of a hand wheel 8, is required in order to swivel the work piece carrier slide 4 into an angular position which depends on the helix angle of the grinding worm 9 as well as on the helix angle of the work piece 10 when grinding helical gears.

For the driving of the work piece 10 a synchronous reaction motor 12 (to be referred to as the work piece motor henceforth) is provided which is fixed to the drum 3. In a bore of the drum 3 co-axial to the axis of the said motor the rotatably mounted cage 13 of a differential gearing is centered. This cage 13 is locked when grinding spur gears. On the end of the shaft of the motor 12 a pinion 14 is keyed which is in mesh with a spur gear 15. The latter is keyed to a shaft 16 on which a further spur gear 17 is keyed. The same is in mesh with a spur gear 18 which transmits the rotational movement to a pinion 24 through a shaft 19 and four change gears 20, 21, 22, 23. These four change gears are chosen and fitted in accordance with the number of teeth of the work piece. The pinion 24 is rotatably journalled in two bores of the drum 3.

A spur gear 25 meshing with the pinion 24 is keyed to a driving shaft 26 rotatably mounted in the work piece carrier slide 4. The said shaft carries a further spur gear 27 which is in turn in mesh with a spur gear 29 fixed to the work spindle 28. The rotary movements of the work spindle 28 are transmitted by the aid of a dog 120 to a clamping mandrel 30 and to the work piece 10 fixed thereon. The clamping mandrel 30 is centered between the centre point of the work spindle and the centre point of the tail stock 31. As already mentioned, the cage 13 of the differential gearing is at a standstill when grinding spur gears. The toothing 1311 provided on the said cage 13 is in mesh with a spur gear 42 which is keyed on a rotatably mounted shaft 43 together with a bevel gear 44. This bevel gear 44 meshes with a bevel gear 45 keyed to a shaft 46. On the end of the shaft pointing away from the bevel gear 45 a disc 47 is mounted. The latter is provided with a pin 48 projecting into a bore 301 provided in the drum 3. By this measure the cage 13, the spur gear 42, the shaft 43, the pair of bevel gears 44, 45 and the shaft 46 are locked.

When grinding helical gears, an additional movement has to be imparted to the work piece which is effected by turning the cage 13 with the aid of the differential gearing. For this purpose the disc 47 designed for locking the aforesaid cage 13 is removed, and a spur gear 49 is fitted to the shaft end concerned, as shown in Fig. 1A. The spur gear 49 forms, together with three further spur gears 50, 51, 52 a train of change gears which is selected in accordance with the helix lead to be generated on the work piece. The change gear 52 is mounted on a shaft 53 which is journalled rotatably in the drum 3 and is provided with a spur gear 54. The latter is in mesh with a toothed rack 55 which is screwed to the work piece carrier slide 4.

The lower portion of the work piece carrier slide 4 is constructed as an oil sump and, in addition to the working spindle 28, houses also a gear pump 32. The latter is driven from the gear 29 through a gear 33 and the pump shaft 34, and is in communication with the oil sump through a suction pipe 35. The oil delivered by the gear pump 32 passes into the flexibly mounted pressure pipe 36. The latter leads to an adjustable pressure regulator valve 37, the drain pipe 38 of which immediately return the overflowing oil to the sump. The oil pressure prevailing in the pressure pipe 36 can be read off a pressure gauge 39.

The pressure regulator valve 37 connected to the drum 3 is in connection through a linage with a control template 40 which is fixed to the work piece carrier slide 4.

A control pin 41 guided in the pressure regulator valve 37 is permanently loaded by a spring 56 which is clamped between the end faces 57 and 58 and is guided in a bore 59. A control rod 60 is screwed into a sleeve 61. The position thereof can be secured by the aid of a nut 62. Upon a variation in the longitudinal position of the control rod 60 relative to the sleeve 61 the spring 56 is either loaded more strongly or it is unloaded. On the sleeve 61, which is guided in a bore 302, moreover a control pin 63 is centered and attached, the feeler of which is constantly in contact with the control template 40.

The grinding worm 9 is mounted on the spindle nose of a grinding spindle 11. The latter is rotatably guided in the bearings 701, 702 of the grinding slide 70, and is directly coupled to the motor shaft 72 by the aid of a sleeve 71. The motor 2, constructed as a synchronous reaction motor (referred to as "the grinder motor" in what follows) is connected by flanges to the grinding slide 70. The latter is mounted on two horizontally running guide ways 74, 75 and can be displaced by means of a threaded spindle 76 journalled in the base 1 and in engagement with a nut 77.

*The grinding process*

Hereinafter the conditions are considered which are met when working:

On the side of the work piece it is provisionally to be assumed that the control template 40 has quite a straight control face. The position of the control rod 60 and the loading of the spring 56 are so selected as required for the work piece 10 to be ground in view of its dimensions, i.e. the torque to be produced on the work spindle 28 or by the work piece motor 12 for the generation of the pressure adjusted at the gear pump 32 is so dimensioned that the variations in torque deriving, when grinding, from the work done by the grinding worm 9 on the work piece 10, are insignificant in comparison. With this assumption it can also be assumed that the loading of the work piece motor 12 and the associated load angle of its rotor remain practically constant during the grinding process. A recording of the electrical power consumed in the course of time would give a straight graph.

On the side of the grinding worm 9 the conditions are such that the power consumed by the grinder motor 2 varies in the course of the grinding process. This power consumption is composed of a component $N_1$ remaining constant which is required mainly for the idling of the grinder motor 2 and for overcoming the friction in the bearings 701, 702 of the grinding spindle, and of a component $N_2$ variable in magnitude which is required during the grinding for machining off material from the work piece 10. Accordingly the resulting load angle appearing on the rotor of the grinder motor 2 forms the sum of two part load angles, one of which corresponds to the first mentioned constant load component and the other to the variable load component required during the grinding.

Figs. 3 to 5 show the conditions during the grinding. The work piece 10 and the grinding worm 9 are forcibly driven by their associated motors 12 and 2, respectively, and rotate in the directions indicated in Figs. 1 and 6. Moreover it has to be assumed that the work piece carrier slide 4 moves at the moment contemplated in the upward direction so that material is being ground off the surfaces of the teeth to be ground. The following explanations apply to the conditions arising in the grinding of spur gears or helical gears. In the figures a spur gear has been shown for the sake of simplicity of illustration.

In Fig. 3 the situation at the beginning of the working stroke of the work piece carrier slide 4 is illustrated. The end face 102 of the work piece 10 is located below the horizontal axis of the grinding worm 9. In this phase of operation no increased loading of the grinder motor 2 is to be ascertained yet. However, as soon as the work piece 10 is moved, at a speed suitable for grinding, in the direction of the arrows indicated in Figs. 3 and 4, an increase in the loading of the grinder motor 2 can be observed, which reaches a maximum magnitude, i.e. full load, as soon as the grinding worm 9 is completely in mesh with the work piece 10. This full load persists until the work piece 10 begins to emerge from the grinding worm 9, and a gradually progressive reduction in loading occurs which takes a course approximately symmetrically to that at the beginning of the working stroke considered. Fig. 4 shows the work piece 10 in the full load phase, while Fig. 5 illustrates the situation at the end of the working stroke.

The loading of the grinder motor 2 during the grinding process contemplated is illustrated in Fig. 7. In this diagram $N_1$ denotes the component of the loading of the grinder motor which remains constant, $N_2$ denotes the additional power output required during the grinding, H denotes the stroke performed by the work piece carrier slide 4, $b_2$ the face width of the gear 10 to be ground, and $b_1$ and $b_3$ the distance between the horizontal axis of the grinding worm 9 and the associated end face of the work piece in the lower and upper end position, respectively (see also Figs. 3 and 5). The stretch $h_1$ indicates the increase of the loading from $N_1$ to full load $(N_1+N_2)$ which is kept up over a stretch $h_2$ to drop again to the base load $N_1$ subsequently, i.e. over a stretch $h_3$.

When being ground the work piece 10 is in engagement free of play with the grinding worm 9. It has been mentioned before that under the assumptions made the work piece 10 does not alter during the grinding process its relative position as viewed in the direction of rotation. On the other hand, on the rotor of the grinder motor 2 and on the grinding worm 9 variations in the load angle can be observed during the two phases $h_1$ and $h_3$ (see Fig. 7), i.e. when the load increases from $N_1$ to $(N_1+N_2)$ or when it drops from $(N_1+N_2)$ to $N_1$. During the phase denoted $h_1$ the load variation from $N_1$ to $(N_1+N_2)$ causes a variation of the load angle, $\Delta\alpha$, in the form of a rotary motion "A" in the anticlockwise direction. This position remains unaltered during the full load period $h_2$. When the loading drops during the period $h_3$, the grinding worm 9—always viewed relatively—returns in the clockwise direction through the same angle $\Delta\alpha$ into the basic position (arrow B).

To these rotary movements, displacements of the profile in the axial direction, viewed relative to the work piece, are associated, the magnitude of which can be calculated from the relation $$\Delta p = \frac{p\Delta\alpha^\circ}{360^\circ}$$

wherein $p$ is the pitch of the grinding worm 9. These displacements of the profile on the grinding worm 9 are not shared by the uniformly rotating work piece 10. As a consequence thereof on the sections $b_4$, $b_5$ of the work piece which are associated during the grinding with variations in the load angle, variations in the direction of the teeth are to be ascertained. These are to be considered as faults, and yield a tooth direction graph as shown in Fig. 9.

Hitherto, it had been assumed that the template 40 on the work piece carrier slide 4 had a straight control face. Accordingly the conditions of the work piece drive were described as stable, i.e. variations in the load angle of the rotor of the work piece motor 12 did not appear (in practice).

The idea, on which the present invention is based, consists in that the variations in the load angle occuring on the rotor of the grinder motor 2 owing to load variations during the grinding are compensated by co-ordinated variations in the load angle of the work piece motor 12 controlled by regulating members in accordance with the first mentioned variations in load angle, so that the position of the work piece 10 relative to the grinding worm 9 in mesh therewith remains constantly the same.

In the embodiment illustrated in Fig. 1 the means used for carrying out this method consist in the control template 40. The shape of its control face is based on the course of the loading graph (see Fig. 7). During the working stroke of the work piece carrier slide 4 the control means controlled by the control template 40 effect load variations in the drive train of the work piece and variations in the load angle on the rotor of the work piece motor 12 which compensate the displacements of the grinding worm 9 due to variations in the load angle on the grinder motor 2 by equivalent ones of the work piece, so that the position of the latter relative to the grinding worm 9 constantly in mesh with are permanently kept.

The course of operations with the use of a control template 40 formed in this manner is as follows:

At the beginning of the up-stroke of the work piece carrier slide 4 the feeler of the control pin 63 slides on the portion 401 of the control template 40. In the course of the grinding process—as described in detail hereinabove—in the period denoted $h_1$ (see Fig. 7) an increase of the loading from $N_1$ to $(N_1+N_2)$ occurs, which results in a variation $\Delta\alpha$ of the load angle, on the rotor of the grinder motor 2 and on the grinding worm. This variation $\Delta\alpha$ in the load angle is compensated in that the feeler of the control pin 63 sliding on the portion 401 of the control template 40, the sleeve 61 and the control rod 60 are displaced towards the right, which results in a gradual load incerase on the spring 56 of the pressure regulator valve 37 and on the gear pump 32. The torque to be additionally provided on the work spindle 28 involves a load increase on the work piece motor 12, and causes, at the end, a load angle variation on its rotor. The said variation is forcibly to be noticed also on the work piece 10, and there takes the appearance under the conditions assumed (as regards direction of rotation and "handing" of the thread of the grinding worm 9)—viewed relatively—as a rotary movement "C" in the clockwise sense (see Fig. 6).

As soon as the work piece carrier slide 4 has covered the stretch denoted $h_1$, stable conditions occur on the grinder motor 2. Accordingly the feeler of the control pin 63 duringt he stretch $h_2$ determining this phase of operations slides on the portion 402 of the control template 40 which is parallel to the axis of rotation of the work piece 10.

After having covered the stretch $h_2$, the loading of the grinder motor 2 begins to drop again, which forcibly causes again variations in the load angle on the rotor of the grinder motor 2 and on the grinding worm 9. The same are compensated on the work piece 10 in that the feeler of the control pin 63 now slides on the descending portion 403 of the control template 40. Consequently the spring 56 of the pressure regulator valve 37 is gradually unloaded. Accordingly the pressure of the oil delivered by the gear pump 32 and the loading of the work piece motor 12 decrease. The load angle of the latter is reduced thereby which makes itself felt also on the work piece as a rotary movement "D"—viewed relatively—in the counter-clockwise sense. The slope angles $\beta_1$ and $\beta_2$ on the control template 40 and the conditions on the pressure regulator valve 37 are selected in accordance with the loading graph (see Fig. 7) and are adapted thereto. The load angle variations attainable on the rotor of the work piece motor 12 in these conditions prevent the disturbances of the grinding process to be otherwise expected owing to load variations on the grinder motor 2.

A further embodiment of a load angle regulation is shown diagrammatically in Fig. 10. The idea of the invention consists here in that load variations of the grinder motor 2 analogous to the load angle variations occurring during the grinding are used for varying the feed voltage of the work piece motor 12 by the aid of combined electrical measuring and regulating instruments, and thereby to effect load angle variations on the rotor of the grinder motor 2, in order that the position of the work piece 10 relative to the grinding worm 9 may be kept constant also in this manner.

As regards the details of this embodiment it may be pointed out, that the gear pump 32 illustrated in Fig. 1 as well as the pressure regulator valve 37 with spring 56 and pressure gauge 39 are also provided here. The control template 40, the sleeve 61 and the control rod 60 are dispensed with and replaced by a screw 90 (see Fig. 11) which permits the adjustment of a certain pressure which however remains constant during the whole grinding process.

In the current supply line tapped from an electric grid RST and denoted by the three phases $R_s$, $S_s$ and $T_s$ a wattmeter 80 is fitted for example into the phase $R_s$ which measures the effective output of the grinder motor 2. It is assumed that the loading of the three individual phases $R_s$, $S_s$, $T_s$ is symmetrical as it should be for a synchronous reaction motor. The amplitudes of the wattmeter 80 are transmitted to a regulator device 81. The latter is built into the current supply line of the work piece motor 12. On the primary side it is connected through the phases $R_{w1}$, $S_{w1}$, $T_{w1}$ with electric mains R, S, T and on the secondary side through the phases $R_{w2}$, $S_{w2}$, $T_{w2}$ with the work piece motor 12.

During the grinding process the load increase on the grinder motor 2 ascertained during the working period denoted $h_1$ (see Fig. 7) is converted in the regulator device 81 in such a manner that in the connecting line (phases $R_{w2}$, $S_{w2}$, $T_{w2}$) between the latter and the work piece motor 12 a reduction in voltage is brought about as compared with the connection line (phases $R_{w1}$, $S_{w1}$, $T_{w1}$). This causes on the rotor of the work piece motor 12 a load angle variation, which is proportionally co-ordinated to the load variation on the rotor of the grinder motor 2 and which is so dimensioned that the work piece 10—viewed relatively—turns in the clockwise sense (Fig. 6) so far, that the position of the work piece 10 relative to the grinding worm 9 is permanently kept.

During the working period denoted $h_2$ the loading of the grinder motor 2 keeps constant. Consequently also the voltage associated with this loading in the connection line having the phases $R_{w2}$, $S_{w2}$, $T_{w2}$ and the load angle on the rotor of the work piece motor 12 remain constant. The drop in load occurring in the course of the final working period $h_3$ (see Fig. 7) on the grinder motor 2 leads in the circumstances described to a proportional co-ordinated voltage increase in the connecting line having the phases $R_{w2}$, $S_{w2}$, $T_{w2}$. This causes a reduction in the load angle on the rotor of the work piece motor 12, and consequently also a rotary movement—viewed relatively—in the counter-clockwise sense on the work piece 10. Consequently also during the third working period contemplated the load angle variation on the grinder motor 2 is automatically compensated by a proportional co-ordinated load angle variation on the rotor of the work piece motor 12.

While I have herein described and illustrated in the accompanying drawing what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A machine for the grinding of spur gears and helical gears by the generating principle, comprising in combination: a base, a grinding slide mounted slidably on the said base, a grinding worm rotatably journalled in the said grinding slide about an axis perpendicular to the direction in which the said grinding slide is slidable, a first synchronous motor mounted on the said grinding slide and having a rotor in driving connection with the said grinding worm, a work piece carrier slide mounted on the said base slidably in a direction perpendicular both to the axis of the said grinding worm and to the direction in which said grinding slide is slidable, centering means mounted on the said work piece carrier slide and adapted to center, and to impart rotation to, a work piece about an axis parallel to the direction in which the said work piece carrier slide is slidable, a second synchronous motor having a rotor in driving connection with the said centering means, and automatic control means operatively connected to the said second synchronous motor and imparting variations in the load angle to the said rotor of the latter corresponding to and compensating the load angle variations on the rotor of the said first synchronous motor so that the position of the work piece relative to the said grinding worm is kept unaffected by the load angle variations occurring on the rotor of the said first synchronous motor while grinding.

2. A machine as claimed in claim 1, wherein the said automatic control means include a gear pump in driving connection with the said second synchronous motor, a pressure regulator valve connected to the delivery end of the said gear pump, a feeler slidably mounted in the said base and operatively connected to the said pressure regulating valve in the sense of adjusting the pressure setting thereof, and a template shaped in conformity with the load angle variations occurring on the rotor of the said first synchronous motor during grinding, the said template being fixed to the said work piece carrier slide and operating the said feeler in the sense of controlling the delivery pressure and hence the power consumption of the said gear pump thereby imparting the said compensating variations in load angle to the rotor of the said second synchronous motor.

3. A machine as claimed in claim 1, wherein the said automatic control means include a measuring instrument electrically connected to the said first synchronous motor and measuring its power consumption and hence the load angle on the said power consumption, and transmission means electrically connected to the said measuring instrument and transmitting the measurements thereof to the said second synchronous motor thereby imparting the said compensating variations in load angle to the rotor thereof.

4. A machine as claimed in claim 3, wherein the said transmission means include an electrical voltage regulator means controlling the feeder voltage of the said second synchronous motor and thereby imparting the said compensating variations in load angle to the rotor thereof.

References Cited in the file of this patent

UNITED STATES PATENTS

| | | |
|---|---|---|
| 2,111,045 | Drummond | Mar. 15, 1938 |
| 2,786,309 | Rickenmann | Mar. 26, 1957 |